(12) United States Patent
Makino et al.

(10) Patent No.: US 7,717,809 B2
(45) Date of Patent: May 18, 2010

(54) MULTI-PIECE SOLID GOLF BALL

(75) Inventors: Shinya Makino, Chichibu (JP);
Hirotaka Shimosaka, Chichibu (JP)

(73) Assignee: Bridgestone Sports Co., Ltd, Tokyo (JP)

(*) Notice: Subject to any disclaimer, the term of this patent is extended or adjusted under 35 U.S.C. 154(b) by 82 days.

(21) Appl. No.: 11/723,289

(22) Filed: Mar. 19, 2007

(65) Prior Publication Data
US 2008/0153628 A1    Jun. 26, 2008

Related U.S. Application Data

(63) Continuation-in-part of application No. 11/642,532, filed on Dec. 21, 2006.

(51) Int. Cl.
*A63B 37/06* (2006.01)

(52) U.S. Cl. ........................ 473/374

(58) Field of Classification Search ............. 473/374, 473/373, 376, 377
See application file for complete search history.

(56) References Cited

U.S. PATENT DOCUMENTS

| | | | |
|---|---|---|---|
| 6,194,505 B1 | 2/2001 | Sone et al. | |
| 6,642,314 B2 | 11/2003 | Sone et al. | |
| 7,008,334 B2 | 3/2006 | Watanabe et al. | |
| 7,037,216 B2 | 5/2006 | Hayashi et al. | |
| 7,059,976 B2 | 6/2006 | Hayashi et al. | |
| 7,077,764 B2 | 7/2006 | Watanabe et al. | |
| 2002/0045501 A1* | 4/2002 | Takemura et al. | 473/378 |
| 2004/0147694 A1 | 7/2004 | Sone et al. | |
| 2005/0233834 A1* | 10/2005 | Watanabe et al. | 473/371 |
| 2006/0154749 A1* | 7/2006 | Ohama et al. | 473/378 |

FOREIGN PATENT DOCUMENTS

| | | |
|---|---|---|
| JP | 11-35633 A | 2/1999 |
| JP | 11-164912 A | 6/1999 |
| JP | 2002-293996 A | 10/2002 |
| JP | 2005-296654 A | 10/2005 |
| JP | 2005-296655 A | 10/2005 |
| JP | 2006-87924 A | 4/2006 |
| JP | 2006-87925 A | 4/2006 |

* cited by examiner

*Primary Examiner*—Raeann Trimiew
(74) *Attorney, Agent, or Firm*—Sughrue Mion, PLLC

(57) ABSTRACT

The invention provides a multi-piece solid golf ball having a core, an outermost layer cover with a surface on which are formed a plurality of dimples, and one or more intermediate layer between the core and the cover. At least one intermediate layer and the outermost layer cover are each formed primarily of an ionomer-containing thermoplastic resin. The resin of which the outermost layer cover is formed contains up to 20 wt % of a ternary copolymer ionomer and has formulated therein from 0.1 to 5.0 parts by weight of short organic fibers per 100 parts by weight of the resin. The golf ball of the invention has a fully satisfactory flight performance and a good feel on impact. Moreover, it has an excellent durability to cracking on repeated impact and also an excellent scuff resistance.

7 Claims, 1 Drawing Sheet

MULTI-PIECE SOLID GOLF BALL

CROSS-REFERENCE TO RELATED APPLICATION

Figure 1:
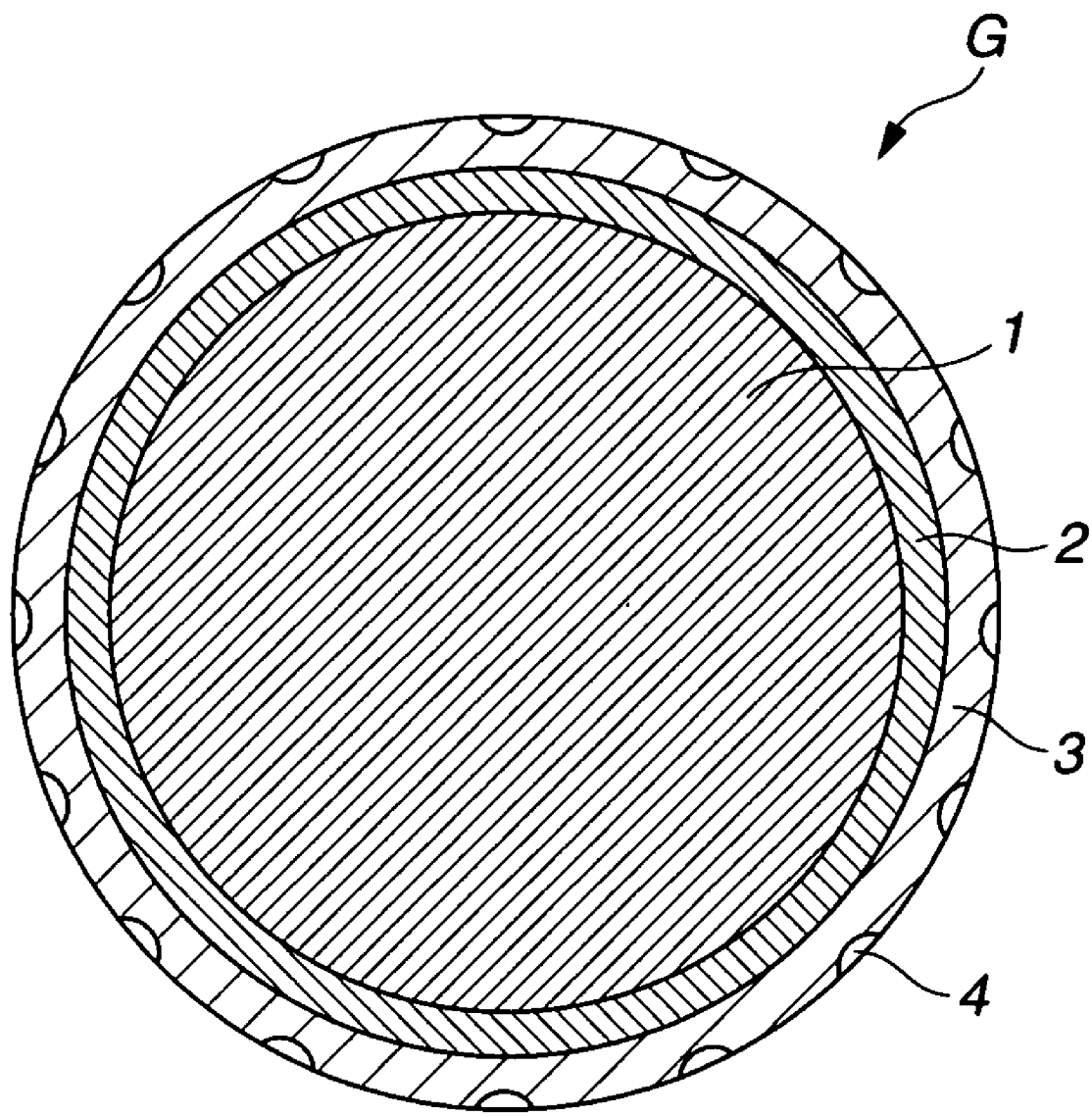

This application is a continuation-in-part of copending application Ser. No. 11/642,532 filed on Dec. 21, 2006, the entire contents of which are hereby incorporated by reference.

BACKGROUND OF THE INVENTION

The present invention relates to a multi-piece solid golf ball composed of a core over which have been formed two or more covers. More specifically, the invention relates to a multi-layer golf ball which enables the distance to be increased due to the ball rebound and a spin rate-lowering effect while retaining a good feel on impact, and which achieves an improved scuff resistance on approach shots.

There exists a desire recently for durability to repeated impact and for resistance to the formation of burrs (scuff resistance) on the surface of the ball arising from repeated impact with various types of clubs. Improvements in durability to cracking on impact and scuff resistance are of critical importance to the golfer as factors in the ability to use a ball for a long time.

At the same time, golf balls which travel farther when played and have a soft feel on impact are very appealing to the player. Ball developers have in the past proposed a variety of balls with this in mind. Numerous disclosures have been made in the art that provide an improved flight performance and an improved control on approach shots by giving the ball a solid, multi-piece construction having two or more cover layers and by optimizing the hardnesses of the respective layers and the core deflection.

Most such multi-piece solid golf balls include as a major component an ionomer resin-based outermost layer cover, but leave something to be desired in terms of their durability to repeated impact and their scuff resistance.

Various attempts have been made to further enhance the durability to cracking and the flight performance. Examples include the art disclosed in JP-A 2006-87925, JP-A 2006-87924, JP-A 2005-296655 and JP-A 2005-296654.

However, because the durability to cracking and flight performance of these prior-art golf balls is not yet sufficient, there remains room for further improvement.

SUMMARY OF THE INVENTION

It is therefore an object of the present invention to provide a multi-piece solid golf ball which has an improved durability to repeated impact and an improved scuff resistance without any loss in distance or in feel on impact.

The inventor has conducted investigations on multi-piece solid golf balls having a basic construction that includes a core, an outermost layer cover and at least one intermediate layer therebetween, the primary focus of the investigations being to improve the resin material used in the outermost layer cover and to incorporate short organic fibers within the resin material. As a result, the inventor has discovered that the distance traveled by the golf ball can be increased owing to the ball rebound and a spin rate-lowering effect while yet retaining a good feel on impact, and that moreover the ball can be endowed with both an excellent durability to cracking on repeated impact and an excellent scuff resistance on approach shots.

Accordingly, the invention provides the following multi-piece solid golf balls.

[1] A multi-piece solid golf ball comprising a core, an outermost layer cover with a surface on which are formed a plurality of dimples, and one or more intermediate layer between the core and the cover, wherein at least one intermediate layer and the outermost layer cover are each formed primarily of an ionomer-containing thermoplastic resin, the resin of which the outermost layer cover is formed containing up to 20 wt % of a ternary copolymer ionomer and having formulated therein from 0.1 to 5.0 parts by weight of short organic fibers per 100 parts by weight of resin.

[2] The multi-piece solid golf ball of [1], wherein the short organic fibers are made of a copolymer comprising a polyolefin component and a polyamide component.

[3] The multi-piece solid golf ball of [1], wherein the outermost layer cover has a Shore D hardness of from 50 to 70, a thickness of from 0.5 to 2.0 mm and a specific gravity of from 0.91 to 1.03; the intermediate layer has a Shore D hardness of from 40 to 60, a thickness of from 0.5 to 2.0 mm, and a specific gravity of from 0.88 to 1.00; and the outermost layer cover and the intermediate layer have a combined thickness of from 1.0 to 4.0 mm.

[4] The multi-piece solid golf ball of [1], wherein the cover has a specific gravity of from 1.0 to 1.3, and has a deflection when compressed under a final load of 1,275 N (130 kgf) from an initial load of 98 N (10 kgf) of from 1.0 to 4.0 mm.

[5] The multi-piece solid golf ball of [1], wherein the dimples have a diameter of from 2 to 6 mm and an overall volume of from 200 to 450 $mm^3$.

[6] The multi-piece solid golf ball of [1], wherein the intermediate layer is formed of a mixture comprising:
  100 parts by weight of a resin component composed of, in admixture,
    a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and
    (e) a non-ionomeric thermoplastic elastomer in a weight ratio between 100:0 and 50:50;
  (c) 5 to 80 parts by weight of a fatty acid and/or fatty acid derivative having a molecular weight of 228 to 1500; and
  (d) 0.1 to 10 parts by weight of a basic inorganic metal compound capable of neutralizing un-neutralized acid groups in the base resin and component (c).

BRIEF DESCRIPTION OF THE DIAGRAMS

FIG. 1 is a schematic sectional view showing a multi-piece solid golf ball (3-layer construction) according to the invention.

DETAILED DESCRIPTION OF THE INVENTION

The invention is described more fully below.

The golf ball of the invention has a multi-piece construction of three or more layers that includes a core, an outermost layer cover, and an intermediate layer therebetween. For example, in the golf ball G shown in FIG. 1, the ball construction may be exemplified as having a core 1, an outermost layer cover 3, and one or more intermediate layer 2 therebetween, the outermost layer cover 3 having numerous dimples 4 formed on an outer surface thereof. The core 1 or the intermediate layer 3 are not limited to one layer, and may be composed of two or more layers.

The core has a deflection when compressed under a final load of 1,275 N (130 kgf) from an initial load of 98 N (10 kgf) which, while not subject to any specific limitation, is set in a range of preferably from 2.5 mm to 5.5 mm, more preferably from 3.0 mm to 5.0 mm, and even more preferably from 3.3 mm to 4.3 mm. If the core is harder than the above range, the golf ball may take on too much spin, failing to travel as far as desired, and may have too hard a feel on impact. On the other hand, if the core is too soft, the ball may have too low a rebound and may thus fail to travel as far as desired, may have too soft a feel when played, and may have a poor durability to cracking on repeated impact.

It is desirable for the core to have a surface hardness which is lower than the hardness of the intermediate layer. If the core surface is harder than the surface of the intermediate layer, the spin rate may rise, as a result of which the ball may not travel as far as desired.

It is desirable for the core to have a specific gravity that is set within the following range. That is, the specific gravity of the core is preferably from 1.0 to 1.3, more preferably from 1.05 to 1.25, and even more preferably from 1.1 to 1.2. At a core specific gravity higher than the above range, the cover weight must be reduced, which decreases the moment of inertia and thus tends to result in a loss in the straightness of the ball's path. On the other hand, at a core specific gravity lower than the above range, the amounts of the various fillers compounded in the core must be lowered, as a result of which it may be difficult to retain the durability and initial velocity of the ball.

The materials in the core are not subject to any particular limitation. For example, the core may be formed using a rubber composition which includes a co-crosslinking agent, an organic peroxide, an inert filler and an organosulfur compound. It is preferable to use polybutadiene as the base rubber in the rubber composition.

It is desirable for the polybutadiene serving as the rubber component to have a cis-1,4-bond content on the polymer chain of at least 60 wt %, preferably at least 80 wt %, more preferably at least 90 wt %, and most preferably at least 95 wt %. Too low a cis-1,4-bond content among the bonds on the molecule may result in a lower resilience.

Moreover, the polybutadiene has a 1,2-vinyl bond content on the polymer chain of typically not more than 2%, preferably not more than 1.7%, and even more preferably not more than 1.5%. Too high a 1,2-vinyl bond content may result in a lower resilience.

The polybutadiene used in the core is one that is synthesized with a rare-earth catalyst. A molded and vulcanized rubber composition composed primarily of this polybutadiene has a good resilience.

The rare-earth catalyst is not subject to any particular limitation. Exemplary rare-earth catalysts include those made up of a combination of a lanthanide series rare-earth compound with an organoaluminum compound, an alumoxane, a halogen-bearing compound and an optional Lewis base.

Examples of suitable lanthanide series rare-earth compounds include halides, carboxylates, alcoholates, thioalcoholates and amides of atomic number 57 to 71 metals.

The use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Suitable examples of such rare-earth catalysts include those mentioned in JP-A 11-35633, JP-A 11-164912 and JP-A 2002-293996.

To enhance the resilience, it is preferable for the polybutadiene synthesized using the lanthanide series rare-earth compound catalyst to account for at least 10 wt %, preferably at least 20 wt %, and more preferably at least 40 wt %, of the rubber components.

Rubber components other than the above-described polybutadiene may be included in the base rubber, insofar as the objects of the invention are attainable. Illustrative examples of rubber components other than the above-described polybutadiene include other polybutadienes, and other diene rubbers, such as styrene-butadiene rubber, natural rubber, isoprene rubber and ethylene-propylene-diene rubber.

Examples of co-crosslinking agents include unsaturated carboxylic acids and the metal salts of unsaturated carboxylic acids.

Specific examples of unsaturated carboxylic acids include acrylic acid, methacrylic acid, maleic acid and fumaric acid. Acrylic acid and methacrylic acid are especially preferred.

The metal salts of unsaturated carboxylic acids, while not subject to any particular limitation, are exemplified by the above-mentioned unsaturated carboxylic acids neutralized with a desired metal ion. Specific examples include the zinc and magnesium salts of methacrylic acid and acrylic acid. The use of zinc acrylate is especially preferred.

The unsaturated carboxylic acid and/or metal salt thereof is included in an amount, per 100 parts by weight of the base rubber, of generally at least 10 parts by weight, preferably at least 15 parts by weight, and more preferably at least 20 parts by weight, but generally not more than 60 parts by weight, preferably not more than 50 parts by weight, more preferably not more than 45 parts by weight, and most preferably not more than 40 parts by weight. Too much may make the core too hard, giving the ball an unpleasant feel on impact, whereas too little may lower the rebound.

The organic peroxide may be a commercially available product, suitable examples of which include Percumyl D (produced by NOF Corporation), Perhexa 3M (NOF Corporation), and Luperco 231XL (Atochem Co.). These may be used singly or as a combination of two or more thereof.

The amount of organic peroxide included per 100 parts by weight of the base rubber is generally at least 0.05 part by weight, preferably at least 0.1 part by weight, more preferably at least 0.2 part by weight, and most preferably at least 0.3 part by weight, but generally not more than 5 parts by weight, preferably not more than 4 parts by weight, more preferably not more than 3 parts by weight, and most preferably not more than 2 parts by weight. Too much or too little organic peroxide may make it impossible to achieve a ball having a good feel, durability and rebound.

Examples of suitable inert fillers include zinc oxide, barium sulfate and calcium carbonate. These may be used singly or as a combination of two or more thereof.

The amount of inert filler included per 100 parts by weight of the base rubber is generally at least 1 part by weight, and preferably at least 5 parts by weight, but generally not more than 50 parts by weight, preferably not more than 40 parts by weight, more preferably not more than 30 parts by weight, and most preferably not more than 20 parts by weight. Too much or too little inert filler may make it impossible to achieve a proper weight and a good rebound.

In addition, an antioxidant may be included if necessary. Illustrative examples of suitable commercial antioxidants include Nocrac NS-6, Nocrac NS-30 (both available from Ouchi Shinko Chemical Industry Co., Ltd.), and Yoshinox 425 (available from Yoshitomi Pharmaceutical Industries, Ltd.). These may be used singly or as a combination of two or more thereof.

The amount of antioxidant included per 100 parts by weight of the base rubber is generally 0 or more part by weight, preferably at least 0.05 part by weight, more preferably at least 0.1 part by weight, and most preferably at least 0.2 part by weight, but generally not more than 3 parts by weight, preferably not more than 2 parts by weight, more preferably not more than 1 part by weight, and most preferably not more than 0.5 part by weight. Too much or too little antioxidant may make it impossible to achieve a good rebound and durability.

To enhance the rebound of the golf ball and increase its initial velocity, it is preferable to include within the core an organosulfur compound.

No particular limitation is imposed on the organosulfur compound, provided it improves the rebound of the golf ball. Exemplary organosulfur compounds include thiophenols, thionaphthols, halogenated thiophenols, and metal salts thereof; and also polysulfides having 2 to 4 sulfurs. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol; and diphenylpolysulfides, dibenzylpolysulfides, dibenzoylpolysulfides, dibenzothiazoylpolysulfides and dithiobenzoylpolysulfides having 2 to 4 sulfurs. The zinc salt of pentachlorothiophenol is especially preferred.

It is recommended that the amount of the organosulfur compound included per 100 parts by weight of the base rubber be generally at least 0.05 part by weight, and preferably at least 0.1 part by weight, but generally not more than 5 parts by weight, preferably not more than 4 parts by weight, more preferably not more than 3 parts by weight, and most preferably not more than 2.5 parts by weight. If too much organosulfur compound is included, the effects of addition may peak so that further addition has no apparent effect, whereas the use of too little organosulfur compound may fail to confer the effects of such addition to a sufficient degree.

In the above-described core, apart from the foregoing organosulfur compound, it is desirable to include sulfur. Including sulfur in the core is an effective way to increase the difference in hardness between the center of the core and the surface of the core. In this way, a low spin rate and a high launch angle are achieved, enabling the distance traveled by the ball to be increased. Specifically, the incorporation of from 0.05 to 5 parts by weight, and particularly 0.1 to 4 parts by weight, of sulfur per 100 parts by weight of the base rubber is preferred.

The outermost layer cover is made primarily of an ionomer-containing thermoplastic resin material. This resin material is preferably composed of a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio of from 100:0 to 0:100. It is preferable to use a base resin in which the content of the metal ion neutralization product of an olefin-unsaturated carboxylic acid-unsaturated carboxylic acid ester ternary random copolymer is 20 wt % or less.

The olefin in the above base resin, for either component (a) or component (b), has a number of carbons which is generally at least 2 but not more than 8, and preferably not more than 6. Specific examples include ethylene, propylene, butene, pentene, hexene, heptene and octene. Ethylene is especially preferred.

Examples of unsaturated carboxylic acids include acrylic acid, methacrylic acid, maleic acid and fumaric acid. Acrylic acid and methacrylic acid are especially preferred.

Moreover, the unsaturated carboxylic acid ester is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin-unsaturated carboxylic acid random copolymer of component (a) and the olefin-unsaturated carboxylic acid-unsaturated carboxylic acid ester ternary random copolymer of component (b) (the copolymers in components (a) and (b) are referred to collectively below as "the random copolymers") can each be obtained by preparing the above-mentioned materials and carrying out random copolymerization by a known method.

It is recommended that the above random copolymers have controlled contents of unsaturated carboxylic acid (acid contents). Here, it is recommended that the content of unsaturated carboxylic acid present in the random copolymer serving as component (a) be generally at least 4 wt %, preferably at least 6 wt %, more preferably at least 8 wt %, and even more preferably at least 10 wt %, but not more than 30 wt %, preferably not more than 20 wt %, more preferably not more than 18 wt %, and even more preferably not more than 15 wt %.

Similarly, it is recommended that the content of unsaturated carboxylic acid present in the random copolymer serving as component (b) be preferably at least 4 wt %, more preferably at least 6 wt %, and even more preferably at least 8 wt %, but not more than 15 wt %, preferably not more than 12 wt %, and even more preferably not more than 10 wt %. If the acid content of the random copolymer is too low, the rebound may decrease, whereas if it is too high, the processability of the resin material may decrease.

The metal ion neutralization product of an olefin-unsaturated carboxylic acid random copolymer of component (a) and the metal ion neutralization product of an olefin-unsaturated carboxylic acid-unsaturated carboxylic acid ester ternary random copolymer of component (b) (the metal ion neutralization products of the copolymers in components (a) and (b) are referred to collectively below as "the metal ion neutralization products of random copolymers") can be obtained by neutralizing some of the acid groups on the random copolymers with metal ions.

Illustrative examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, preferred use can be made of, for example, $Na^+$, $Li^+$, $Zn^{++}$ and $Mg^{++}$.

The above metal ion neutralization products of the random copolymers may be obtained by neutralizing the random copolymers with the foregoing metal ions. For example, use may be made of a method in which neutralization is carried out with a compound such as a formate, acetate, nitrate, carbonate, bicarbonate, oxide, hydroxide or alkoxide of the above-mentioned metal ions. No particular limitation is imposed on the degree of neutralization of the random copolymer by these metal ions.

Commercially available products may be used as the base resins of above components (a) and (b). Illustrative examples of the random copolymer in component (a) include Nucrel 1560, Nucrel 1214 and Nucrel 1035 (all products of DuPont-Mitsui Polychemicals Co., Ltd.), and Escor 5200, Escor 5100 and Escor 5000 (all products of ExxonMobil Chemical). Illustrative examples of the random copolymer in component (b) include Nucrel AN 4311 and Nucrel AN 4318 (both products of DuPont-Mitsui Polychemicals Co., Ltd.), and Escor ATX325, Escor ATX320 and Escor ATX310 (all products of ExxonMobil Chemical).

Illustrative examples of the metal ion neutralization product of the random copolymer in component (a) include Himilan 1554, Himilan 1557, Himilan 1601, Himilan 1605, Himilan 1706 and Himilan AM7311 (all products of DuPont-Mitsui Polychemicals Co., Ltd.), Surlyn 7930 and Surlyn 8945 (E.I. DuPont de Nemours & Co.), and Iotek 3110 and Iotek 4200 (both products of ExxonMobil Chemical). Illustrative examples of the metal ion neutralization product of the random copolymer in component (b) include Himilan 1855, Himilan 1856, Himilan AM7316 and Himilan 7331 (all products of DuPont-Mitsui Polychemicals Co., Ltd.), Surlyn 6320, Surlyn 8320, Surlyn 9320 and Surlyn 8120 (all products of E.I. DuPont de Nemours & Co.), and Iotek 7510 and Iotek 7520 (both products of ExxonMobil Chemical).

When preparing the above-described base resin, the metal ion neutralization product of an olefin-unsaturated carboxylic acid-unsaturated carboxylic acid ester ternary random copolymer must be included in a content of no more than 20 wt %. This content is preferably from 1 to 20 wt %, and more preferably from 2 to 15 wt %. At above 20 wt %, the hardness required of the cover is not obtained and the rebound decreases. On the other hand, at less than 1 wt %, the scuff resistance may decrease.

In addition, component (e) described below may be added to the base resin of the above resin material. Component (e) is a non-ionomeric thermoplastic elastomer. The purpose of this component is to further improve the feel of the ball on impact and the rebound. Examples include olefin elastomers, styrene elastomers, polyester elastomers, urethane elastomers and polyamide elastomers. To further increase the rebound, it is preferable to use a polyester elastomer or an olefin elastomer. The use of an olefin elastomer composed of a thermoplastic block copolymer which includes crystalline polyethylene blocks as the hard segments is especially preferred.

A commercially available product may be used as component (e). Illustrative examples include Dynaron (JSR Corporation) and the polyester elastomer Hytrel (DuPont-Toray Co., Ltd.).

The outermost layer cover has formulated therein short organic fibers in an amount of from 0.1 to 5.0 parts by weight per 100 parts by weight of the resin of which the outermost layer cover is primarily composed. By including such short organic fibers, the durability of the ball to repeated impact is improved.

The short organic fibers, while not subject to any particular limitation, are preferably made of a copolymer having a polyolefin component and a polyamide component. Specific examples are given below.

Examples of the polyolefin component include low-density polyethylene (LDPE), high-density polyethylene (HDPE), polypropylene and polystyrene. Of these, polyethylene, especially highly crystalline, low-density polyethylene, is preferred.

Illustrative examples of the polyamide component include nylon 6, nylon 66, nylon 11, nylon 12, nylon 610, nylon 612, copolymeric nylon, nylon MXD6, nylon 46, aramids, polyamide-imides and polyimides. Nylon 6 is preferred because of the good balance it provides between properties and cost. It is advantageous for the polyamide component to be in a fibrous form, with nylon fiber being especially preferred. The nylon fibers have an average diameter of 10 µm or less, preferably 5 µm or less, and more preferably 1 µm or less, although an average diameter of at least 0.01 µm is desirable to elicit an effective reinforcing effect for the amount of addition thereof. "Average diameter" refers here to a measured value obtained by examining sample cross-sections using a transmission electron microscope.

It is particularly advantageous for the above copolymer to be in a form where a crystalline polyolefin component is bonded to the surface of the nylon fibers. Here, "bonded" signifies graft bonding between the polyamide component and the polyolefin component by the addition of a binder. Examples of binders that may be used for this purpose include silane coupling agents, titanate coupling agents, unsaturated carboxylic acids, unsaturated carboxylic acid derivatives and organic peroxides.

In the above copolymer, it is advantageous for the weight ratio of the polyolefin component (f) to the polyamide component (g), expressed as f/g, to be from 25/75 to 95/5, preferably from 30/70 to 90/10, and more preferably from 40/60 to 75/25. With too little polyamide component, an adequate reinforcing effect may not be achieved. On the other hand, with too much polyamide component, proper mixture with the resin components may not be achieved during mixing in an apparatus such as a twin-screw extruder.

The short organic fibers are included in an amount, per 100 parts by weight of the resin of which the outermost layer cover is primarily made, of from 0.1 to 5.0 parts by weight, preferably from 0.5 to 4.0 parts by weight, and more preferably from 0.7 to 3.0 parts by weight. If too little of the short organic fibers is included, sufficient effects will not be achieved. On the other hand, too much short organic fiber will render mixing difficult and also make it difficult to mold the golf ball cover.

To retain the shape of the polyamide component as much as possible, it is advantageous, though not essential, for the temperature at which the above base resin and the short organic fibers are blended together to be at least the melting point of the polyolefin component, and preferably at least 10° C. above the melting point of the polyolefin component, but not higher than the melting point of the polyamide component, and preferably not higher than 10° C. below the melting point of the polyamide component. The temperature of the resin when it is molded into a golf ball is preferably within the above-indicated temperature range, although the temperature may exceed the above range if necessary.

In addition to the above resin components, various additives may be optionally included in the resin composition used to form the outermost layer cover. Illustrative examples of such additives include pigments, dispersants, antioxidants, ultraviolet absorbers, ultraviolet stabilizers, parting agents, plasticizers and inorganic fillers (e.g., zinc oxide, barium sulfate, titanium dioxide).

Next, the intermediate layer is described.

The intermediate layer in the present invention is one or more layer disposed between the above-described core and the above-described outermost layer cover.

It is preferable for an ionomer-containing thermoplastic resin to be selected as the primary material in the intermediate layer. The use of a resin mixture formulated as follows from the components (a) to (e) below is especially preferred:

100 parts by weight of a resin component composed of, in admixture, a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin-unsaturated carboxylic acid-unsaturated carboxylic acid ester ternary random copolymer in a weight ratio between 100:0 and 0:100, and (e) a non-ionomeric thermoplastic elastomer in a weight ratio between 100:0 and 50:50;

(c) 5 to 80 parts by weight of a fatty acid and/or fatty acid derivative having a molecular weight of 228 to 1500; and (d) 0.1 to 10 parts by weight of a basic inorganic metal compound capable of neutralizing un-neutralized acid groups in the base resin and component (c).

Details concerning above components (a), (b) and (e) are the same as for components (a), (b) and (e) in the outermost layer cover material already described above.

Component (c) described below may be added to the base resin (which is composed of (a) and/or (b), and optionally (e)). Component (c) is a fatty acid or fatty acid derivative having a molecular weight of at least 228 but not more than 1500. Compared with the base resin, this component has a very low molecular weight and, by suitably adjusting the melt viscosity of the mixture, helps in particular to improve the flow properties. Component (c) includes a relatively high content of acid groups (or derivatives), and is capable of suppressing an excessive loss in resilience.

The fatty acid or fatty acid derivative of component (c) has a molecular weight of at least 228, preferably at least 256, more preferably at least 280, and even more preferably at least 300, but not more than 1,500, preferably not more than 1,000, even more preferably not more than 600, and most preferably not more than 500. If the molecular weight is too low, the heat resistance cannot be improved. On the other hand, if the molecular weight is too high, the flow properties cannot be improved.

The fatty acid or fatty acid derivative of component (c) may be an unsaturated fatty acid (or derivative thereof) containing a double bond or triple bond on the alkyl moiety, or it may be a saturated fatty acid (or derivative thereof) in which the bonds on the alkyl moiety are all single bonds. It is recommended that the number of carbons on the molecule be preferably at least 18, more preferably at least 20, even more preferably at least 22, and most preferably at least 24, but not more than 80, preferably not more than 60, more preferably not more than 40, and even more preferably not more than 30. Too few carbons may make it impossible to improve the heat resistance and may also make the acid group content so high as to diminish the flow-improving effect due to interactions with acid groups present in the base resin. On the other hand, too many carbons increases the molecular weight, as a result of which a distinct flow-improving effect may not appear.

Specific examples of the fatty acid of component (c) include stearic acid, 1,2-hydroxystearic acid, behenic acid, oleic acid, linoleic acid, linolenic acid, arachidic acid and lignoceric acid. Of these, stearic acid, arachidic acid, behenic acid and lignoceric acid are preferred. Behenic acid is especially preferred.

The fatty acid derivative of component (c) is exemplified by metallic soaps in which the proton on the acid group of the fatty acid has been replaced with a metal ion. Examples of the metal ion include $Na^+$, $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of fatty acid derivatives that may be used as component (c) include magnesium stearate, calcium stearate, zinc stearate, magnesium 1,2-hydroxystearate, calcium 1,2-hydroxystearate, zinc 1,2-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Component (d) may be added as a basic inorganic metal compound capable of neutralizing acid groups in the base resin and in component (c). If component (d) is not included, when a metallic soap-modified ionomer resin (e.g., the metallic soap-modified ionomer resins cited in the above-mentioned patent publications) is used alone, the metallic soap and un-neutralized acid groups present on the ionomer resin undergo exchange reactions during mixture under heating, generating a large amount of fatty acid. Because the fatty acid has a low thermal stability and readily vaporizes during molding, it may cause molding defects. Moreover, if the fatty acid thus generated deposits on the surface of the molded material, it may substantially lower paint film adhesion and may have other undesirable effects such as lowering the resilience of the resulting molded material.

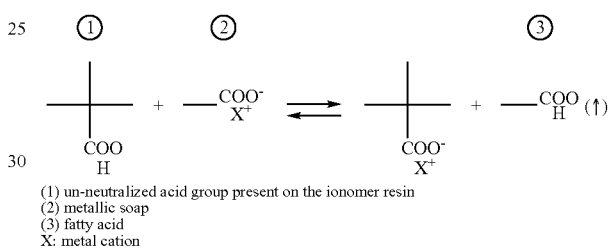

(1) un-neutralized acid group present on the ionomer resin
(2) metallic soap
(3) fatty acid
X: metal cation The inclusion of a basic inorganic metal compound (d) which neutralizes the acid groups present in the base resin and component (c) as an essential component in order to overcome such a problem serves to improve the resilience of the molded material.

That is, by including component (d) as an essential ingredient in the material, not only are the acid groups in the base resin and component (c) neutralized, through synergistic effects from the proper addition of each of these components it is possible as well to increase the thermal stability of the mixture and thus confer a good moldability, and also to enhance the resilience.

Here, it is recommended that the basic inorganic metal compound used as component (d) be a compound having a high reactivity with the base resin and containing no organic acids in the reaction by-products, enabling the degree of neutralization of the mixture to be increased without a loss of thermal stability.

Illustrative examples of the metal ions in the basic inorganic metal compound serving as component (d) include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. In particular, a hydroxide or a monoxide is recommended. Calcium hydroxide and magnesium oxide, which have a high reactivity with the base resin, are more preferred. Calcium hydroxide is especially preferred.

Because the above-described resin material is arrived at by blending specific respective amounts of components (c) and (d) with the resin component, i.e., the base resin containing specific respective amounts of components (a) and (b) in combination with optional component (e), this material has excellent thermal stability, flow properties and moldability, and can impart the molded material with a markedly improved resilience.

Components (c) and (d) are included in respective amounts, per 100 parts by weight of the resin component suitably formulated from components (a), (b) and (e), of at least 5 parts by weight, preferably at least 10 parts by weight, more preferably at least 15 parts by weight, and even more preferably at least 18 parts by weight, but not more than 80 parts by weight, preferably not more than 40 parts by weight, more preferably not more than 25 parts by weight, and even more preferably not more than 22 parts by weight, of component (c); and at least 0.1 part by weight, preferably at least 0.5 part by weight, more preferably at least 1 part by weight, and even more preferably at least 2 parts by weight, but not more than 10 parts by weight, preferably not more than 8 parts by weight, more preferably not more than 6 parts by weight, and even more preferably not more than 5 parts by weight, of component (d). Too little component (c) lowers the melt viscosity, resulting in inferior processability, whereas too much lowers the durability. Too little component (d) fails to improve thermal stability and resilience, whereas too much instead lowers the heat resistance of the golf ball-forming material due to the presence of excess basic inorganic metal compound.

In the above-described resin material formulated from the respective above-indicated amounts of the resin component and components (c) and (d), it is recommended that at least 50 mol %, preferably at least 60 mol %, more preferably at least 70 mol %, and even more preferably at least 80 mol %, of the acid groups be neutralized. Such a high degree of neutralization makes it possible to more reliably suppress the exchange reactions that cause trouble when only a base resin and a fatty acid or fatty acid derivative are used as in the above-cited prior art, thus preventing the generation of fatty acid. As a result, there is obtained a resin material of substantially improved thermal stability and good processability which can provide molded products of much better resilience than prior-art ionomer resins.

"Degree of neutralization," as used above, refers to the degree of neutralization of acid groups present within the mixture of the base resin and the fatty acid or fatty acid derivative serving as component (c), and differs from the degree of neutralization of the ionomer resin itself when an ionomer resin is used as the metal ion neutralization product of a random copolymer in the base resin. A mixture according to the invention having a certain degree of neutralization, when compared with an ionomer resin alone having the same degree of neutralization, contains a very large number of metal ions. This large number of metal ions increases the density of ionic crosslinks which contribute to improved resilience, making it possible to confer the molded product with excellent resilience.

The resin material should preferably have a melt flow rate adjusted to ensure flow properties that are particularly suitable for injection molding, and thus improve moldability. Specifically, it is recommended that the melt flow rate (MFR), as measured according to JIS K7210 at a test temperature of 190° C. and under a load of 21.18 N (2.16 kgf), be set to generally at least 0.5 dg/min, preferably at least 1 dg/min, more preferably at least 1.5 dg/min, and even more preferably at least 2 dg/min, but not more than 20 dg/min, preferably not more than 10 dg/min, more preferably not more than 5 dg/min, and even more preferably not more than 3 dg/min. Too high or low a melt flow rate may result in a substantial decline in processability.

The material from which the intermediate layer is formed has a hardness, expressed as the Durometer D hardness, which, while not subject to any particular limitation, is preferably at least 40 but not more than 60, more preferably at least 45 but not more than 55, and even more preferably at least 48 but not more than 52. If the intermediate layer material is softer than the above range, the spin rate of the ball may increase excessively and the rebound may decrease, as a result of which the ball may not travel as far as desired. On the other hand, if this material is harder than the above range, the durability of the ball to cracking under repeated impact may worsen and the ball may have a poor feel when played.

The intermediate layer has a specific gravity which, while not subject to any particular limitation, is preferably from 0.88 to 1.00, more preferably from 0.90 to 0.98, and even more preferably from 0.92 to 0.96. If the specific gravity of the intermediate layer is too high, the distribution of weight to the core will be lower, as a result of which it may not be possible to retain the durability or initial velocity of the ball. On the other hand, if the specific gravity of the intermediate layer is too low, the distribution of weight to the core will be higher, decreasing the moment of inertia and thus tending to reduce the straightness of the ball's path.

The intermediate layer has a thickness (single layer thickness) which, while not subject to any particular limitation, is typically at least 0.5 mm but not more than 2.0 mm, preferably at least 0.75 mm but not more than 1.75 mm, and more preferably at least 1.0 mm but not more than 1.5 mm. A thicker intermediate layer may worsen the feel of the ball on impact, in addition to which it may increase the spin rate, as a result of which the ball may not travel as far as desired. On the other hand, a thinner intermediate layer makes the ball molding operation more difficult to carry out and may result in a finished product that is defective.

The multi-piece solid golf ball of the invention can be manufactured using an ordinary process such as a known injection molding process to form on top of one another the respective layers described above—the core, the intermediate layer, and the outermost layer cover. For example, a molded and vulcanized article composed primarily of the rubber material may be placed as the core within a particular injection-molding mold, following which the intermediate layer material may be injection-molded in this order to give an intermediate spherical body. The spherical body may then be placed within another injection-molding mold and the cover material injection-molded over the spherical body to give a multi-piece golf ball. Alternatively, the cover may be formed as a layer over the intermediate spherical body by, for example, placing two half-cups, molded beforehand as hemispherical shells, around the intermediate spherical body so as to encase it, then molding under applied heat and pressure.

Numerous dimples may be formed on the surface of the cover. The dimples arranged on the cover surface, while not subject to any particular limitation, number preferably at least 280 but not more than 360, more preferably at least 300 but not more than 350, and even more preferably at least 320 but not more than 340. If the number of dimples is higher than the above range, the ball will tend to have a low trajectory, which may shorten the distance of travel. On the other hand, if the number of dimples is too small, the ball will tend to have a high trajectory, as a result of which an increased distance may not be achieved.

Any one or combination of two or more dimple shapes, including circular shapes, various polygonal shapes, dewdrop shapes and oval shapes, may be suitably used. If circular dimples are used, the diameter of the dimples may be set to from about 2 to about 6 mm, and preferably to from 3 to 5 mm.

The total volume of the dimples, while not subject to any particular limitation, is preferably set within a range of from 200 to 450 mm$^3$ so as to effectively manifest the aerodynamic characteristics of the dimples.

The golf ball of the invention, which can be manufactured so as to conform with the Rules of Golf for competitive play, may be produced to a ball diameter which is of a size that will not pass through a ring having an inside diameter of 42.672 mm, but is not more than 42.80 mm, and to a weight of generally from 45.0 to 45.93 g.

As explained above, the inventive multi-piece solid golf ball has a fully satisfactory flight performance and a good feel on impact, in addition to which it has an excellent durability to cracking on repeated impact and an excellent scuff resistance.

EXAMPLES

Examples of the invention and Comparative Examples are given below by way of illustration, and not by way of limitation.

Examples 1 to 4, Comparative Examples 1 to 6

Core Formation

Rubber compositions were formulated as shown in Table 1, then molded and vulcanized under vulcanization conditions of 155° C. and 15 minutes to form cores.

Polybutadiene (I): Available from JSR Corporation under the trade name BR 730.

Polybutadiene (II): Available from JSR Corporation under the trade name BR 51.

Peroxide (1): Available from NOF Corporation under the trade name Perhexa 3M-40.

Peroxide (2): Available from NOF Corporation under the trade name Percumyl D.

Antioxidant: 2,2'-Methylenebis(4-methyl-6-t-butyl-phenol), produced by Ouchi Shinko Chemical Industry Co., Ltd. under the trade name Nocrac NS-6.

Formation of Intermediate Layer and Outermost Layer Cover

Next, the intermediate layer and outermost layer cover formulated from the various resin components shown in Table 2 were injection-molded, thereby forming and encasing the core with, in order: an intermediate layer and an outermost layer cover. Numerous dimples in an arrangement that was common to all the examples of the invention and the comparative examples were formed on the surface of the outermost layer cover, thereby producing multi-piece solid golf balls.

TABLE 1

| (parts by weight) | Example | | | | Comparative Example | | | | | |
|---|---|---|---|---|---|---|---|---|---|---|
| | 1 | 2 | 3 | 4 | 1 | 2 | 3 | 4 | 5 | 6 |
| Polybutadiene (I) | 80 | 80 | 80 | 80 | 80 | 80 | 80 | 80 | 80 | 80 |
| Polybutadiene (II) | 20 | 20 | 20 | 20 | 20 | 20 | 20 | 20 | 20 | 20 |
| Peroxide (1) | 0.3 | 0.3 | 3 | 0.6 | 0.3 | 0.3 | 0.3 | 0.3 | 0.3 | 0.3 |
| Peroxide (2) | 0.3 | 0.3 | | 0.6 | 0.3 | 0.3 | 0.3 | 0.3 | 0.3 | 0.3 |
| Antioxidant | 0.1 | 0.1 | 0.1 | 0.1 | 0.1 | 0.1 | 0.1 | 0.1 | 0.1 | 0.1 |
| Sulfur | | | | 0.1 | | | | | | |
| Zinc oxide | 29.9 | 30.5 | 5.0 | 5.0 | 29.9 | 29.9 | 30.5 | 29.9 | 29.9 | 29.9 |
| Zinc acrylate | 28.0 | 26.5 | 34.0 | 24.0 | 28.0 | 28.0 | 26.5 | 28.0 | 28.0 | 28.0 |
| Barium sulfate | | | 20.0 | 21.0 | | | | | | |
| Zinc stearate | 5 | 5 | | | 5 | 5 | 5 | 5 | 5 | 5 |
| Zinc salt of pentachlorothiophenol | 1 | 1 | 1 | | 1 | 1 | 1 | 1 | 1 | 1 |

Trade names for some the materials appearing in the table are given below.

TABLE 2

| | (parts by weight) | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Intermediate layer | Himilan AM7331 | 85 | 85 | 85 | 85 | 85 | 85 | 85 | 85 | 85 | 85 |
| | Dynaron 6100P | 15 | 15 | 15 | 15 | 15 | 15 | 15 | 15 | 15 | 15 |
| | Behenic acid | 20 | 20 | 20 | 20 | 20 | 20 | 20 | 20 | 20 | 20 |
| | Calcium hydroxide | 2.9 | 2.9 | 2.9 | 2.9 | 2.9 | 2.9 | 2.9 | 2.9 | 2.9 | 2.9 |
| Outermost layer cover | Himilan 1557 | 75 | 75 | 75 | 75 | 75 | 35 | 35 | 30 | | 100 |
| | Himilan 1605 | | | | | | 35 | 35 | | 50 | |
| | Himilan 1855 | | | | | | 15 | 15 | 20 | | |
| | Himilan 1706 | | | | | | | | | 50 | |
| | Surlyn 8945 | 20 | 20 | 20 | 20 | 20 | | | | | |
| | Himilan AM7331 | 5 | 5 | 5 | 5 | 5 | 15 | 15 | 50 | | |
| | Polyolefin/polyamide copolymer | 1 | 1 | 1 | 1 | | | | | | 1 |
| | Barium sulfate 300 | 1 | 1 | 1 | 1 | 1 | | | 1 | | |
| | Titanium oxide | 4 | 4 | 4 | 4 | 4 | 3 | 3 | 3 | 4 | 3 |
| | Blue pigment | 0.04 | 0.04 | 0.04 | 0.04 | 0.04 | 0.05 | 0.05 | 0.01 | 0.03 | 0.05 |
| | Magnesium stearate | 1 | 1 | 1 | 1 | 1 | 1 | 1 | 1 | 0.5 | 1 |

Trade names for some of the materials appearing in the above table are given below.

Himilan AM7331: An ionomer resin (sodium salt of an ethylene-methacrylic acid-acrylic acid ester ternary copolymer) produced by DuPont-Mitsui Polychemicals Co., Ltd.
Surlyn 8945: An ionomer resin (sodium salt of ethylene-methacrylic acid copolymer) produced by E.I. DuPont de Nemours & Co.
Dynaron 6100P: A hydrogenated polymer produced by JSR Corporation.
Behenic acid: NAA222-S (beads), produced by NOF Corporation.
Calcium hydroxide: CLS-B, produced by Shiraishi Kogyo.
Polyolefin/polyamide copolymer: LA0010 produced by Daiwa Polymer KK; weight ratio of polyolefin (low-density polyethylene)/polyamide (nylon 6) short fibers=50/50.

The flight performance, durability to cracking and scuff resistance of the golf balls obtained in Examples 1 to 4 of the invention and Comparative Examples 1 to 6 were evaluated according to the following criteria.

Core Deflection

The core was placed on a hard plate, and the deflection (mm) by the core when compressed under a final load of 1,275 N (130 kgf) from an initial load of 98 N (10 kgf) was measured.

Hardnesses of Intermediate Layer and Outermost Layer Cover

The resin materials were formed into sheets, and the hardnesses were measured with a type D durometer in accordance with ASTM-2240.

Ball Diameter

The diameter (mm) was measured at a dimple-free area of the ball surface.

Thicknesses of Outermost Layer Cover and Intermediate Layer

The value was calculated as (diameter after formation of cover and intermediate layer−diameter before formation)÷2.

Flight Performance

The initial velocity and spin rate of a ball when hit at a head speed (HS) of 45 m/s with a driver (X-DRIVE 405 PROSPEC, manufactured by Bridgestone Sports Co., Ltd.; loft angle, 9.5°) mounted on a swing robot (Miyamae Co., Ltd.) were measured using a high-speed camera.

Scuff Resistance

Tests were carried out in which a sand wedge (X-WEDGE, manufactured by Bridgestone Sports Co., Ltd.; loft, 58°) was set in a swing robot (Miyamae Co., Ltd.), and the ball was hit. Five judges then assigned scores to the balls according to the following criteria.
  5: Ball can continue to be used as before
  4: Substantially no problem
  3: No major problem
  2: Condition of ball is questionable
  1: Ball cannot be used again
The following ratings are used in the table.
  Good: Average score for the five judges was above 4
  Fair: Average score for the five judges was from 2 to 4
  NG: Average score for the five judges was below 2

Durability to Cracking

A ball was repeatedly fired against an iron plate at a velocity of 43 m/s, and the number of times the ball was shot before it cracked was determined. The number of shots obtained for each test ball was then numerically expressed based on an arbitrary value of 100 for the number of shots taken with a concurrently evaluated commercial ball (ALTUS NEWING) before it cracked. The durability to cracking is good so that there is much numerical value in Table 3.

TABLE 3

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Core | Diameter (mm) | 36.6 | 36.6 | 37.7 | 35.3 | 36.6 | 36.6 | 36.6 | 36.6 | 36.6 | 36.6 |
| | Deflection (mm) | 3.7 | 3.9 | 3.6 | 4.0 | 3.7 | 3.7 | 3.9 | 3.7 | 3.7 | 3.7 |
| Intermediate layer | Diameter (mm) | 39.7 | 39.7 | 40.2 | 38.6 | 39.7 | 39.7 | 39.7 | 39.7 | 39.7 | 39.7 |
| | Thickness (mm) | 1.55 | 1.55 | 1.25 | 1.70 | 1.55 | 1.55 | 1.55 | 1.55 | 1.55 | 1.55 |
| | Deflection (mm) | 3.5 | 3.7 | 3.5 | 3.5 | 3.5 | 3.5 | 3.7 | 3.5 | 3.5 | 3.5 |
| | Hardness (Shore D) | 51 | 51 | 51 | 51 | 51 | 51 | 51 | 51 | 51 | 51 |
| Cover | Thickness (mm) | 1.50 | 1.50 | 1.25 | 2.00 | 1.50 | 1.50 | 1.50 | 1.50 | 1.50 | 1.50 |
| | Hardness (Shore D) | 58 | 58 | 58 | 58 | 58 | 58 | 58 | 53 | 60 | 58 |
| Ball | Diameter (mm) | 42.7 | 42.7 | 42.7 | 42.7 | 42.7 | 42.7 | 42.7 | 42.7 | 42.7 | 42.7 |
| | Weight (g) | 45.2 | 45.2 | 45.2 | 45.2 | 45.2 | 45.2 | 45.2 | 45.2 | 45.2 | 45.2 |
| | Hardness (mm) | 3.1 | 3.4 | 3.1 | 3.0 | 3.1 | 3.1 | 3.4 | 3.3 | 3.0 | 3.1 |
| | Initial velocity (m/s) | 77.3 | 77.3 | 77.3 | 77.3 | 77.3 | 77.3 | 77.3 | 77.3 | 77.2 | 76.7 |
| Flight performance W#1 HS45 | Spin rate (rpm) | 2674 | 2613 | 2565 | 2690 | 2670 | 2661 | 2594 | 2708 | 2688 | 2668 |
| | Initial velocity (m/s) | 63.6 | 63.4 | 63.4 | 63.6 | 63.4 | 63.6 | 63.4 | 63.2 | 63.6 | 62.2 |
| | Distance (m) | 240.4 | 242.9 | 243.2 | 240.0 | 240.8 | 241.4 | 242.6 | 239.2 | 242.2 | 237.4 |

TABLE 3-continued

|  | Example | | | | Comparative Example | | | | | |
| --- | --- | --- | --- | --- | --- | --- | --- | --- | --- | --- |
|  | 1 | 2 | 3 | 4 | 1 | 2 | 3 | 4 | 5 | 6 |
| Scuff resistance | good | good | good | good | NG | NG | NG | NG | good | good |
| Durability to cracking | 121 | 118 | 113 | 130 | 108 | 113 | 110 | 119 | 104 | 125 |

From the results in Table 3, the golf balls obtained in Comparative Examples 1 to 6 were inferior in the following ways to the balls obtained according to the invention.

In Comparative Example 1, the outermost layer cover contained no short organic fibers, as a result of which the ball had a poor durability to cracking.

In Comparative Example 2, the outermost layer cover contained no short organic fibers, as a result of which the ball had a poor scuff resistance.

In Comparative Example 3, the outermost layer cover contained no short organic fibers, as a result of which the ball had a poor scuff resistance.

In Comparative Example 4, short organic fibers were not included in the outermost layer cover, in addition to which the content of ternary copolymer was too high. As a result, the ball had a high spin rate on shots with a W#1, failed to achieve a sufficient distance, and had a poor scuff resistance.

In Comparative Example 5, a ternary copolymer and short organic fibers were not included in the outermost layer cover, as a result of which the ball had a poor feel on impact and a poor durability to cracking.

In Comparative Example 6, the resin material for the outermost layer cover was composed only of a zinc-neutralized binary ionomer, as a result of which the ball had a poor rebound and failed to achieve a sufficient distance.

The invention claimed is:

1. A multi-piece solid golf ball comprising a core, an outermost layer cover with a surface on which are formed a plurality of dimples, and one or more intermediate layer between the core and the cover, wherein at least one intermediate layer and the outermost layer cover are each formed primarily of an ionomer-containing thermoplastic resin, the resin of which the outermost layer cover is formed containing from 1 to 20 wt % of a ternary copolymer ionomer and having formulated therein from 0.1 to 5.0 parts by weight of short organic fibers per 100 parts by weight of resin.

2. The multi-piece solid golf ball of claim 1, wherein the short organic fibers are made of a copolymer comprising a polyolefin component and a polyamide component.

3. The multi-piece solid golf ball of claim 1, wherein the outermost layer cover has a Shore D hardness of from 50 to 70, a thickness of from 0.5 to 2.0 mm and a specific gravity of from 0.91 to 1.03; the intermediate layer has a Shore D hardness of from 40 to 60, a thickness of from 0.5 to 2.0 mm, and a specific gravity of from 0.88 to 1.00; and the outermost layer cover and the intermediate layer have a combined thickness of from 1.0 to 4.0 mm.

4. The multi-piece solid golf ball of claim 1, wherein the core has a specific gravity of from 1.0 to 1.3, and has a deflection when compressed under a final load of 1,275 N (130 kgf) from an initial load of 98 N (10 kgf) of from 1.0 to 4.0 mm.

5. The multi-piece solid golf ball of claim 1, wherein the dimples have a diameter of from 2 to 6 mm and an overall volume of from 200 to 450 mm3.

6. The multi-piece solid golf ball of claim 1, wherein the intermediate layer is formed of a mixture comprising:

100 parts by weight of a resin component composed of, in admixture, a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester ternary random copolymer and/or a metal ion neutralization product of an olefin unsaturated carboxylic acid-unsaturated carboxylic acid ester ternary random copolymer in a weight ratio between 100:0 and 0:100, and (e) a non-ionomeric thermoplastic elastomer in a weight ratio between 100:0 and 50:50;

(c) 5 to 80 parts by weight of a fatty acid and/or fatty acid derivative having a molecular weight of 228 to 1500; and (d) 0.1 to 10 parts by weight of a basic inorganic metal compound capable of neutralizing un-neutralized acid groups in the base resin and component (c).

7. The multi-piece solid golf ball of claim 1, wherein the content of the ternary copolymer ionomer of the outermost layer cover is 2 to 15 wt. % of the resin of the outermost layer cover.

* * * * *